H. T. HUGHES.
CHAIN LINK CONNECTOR.
APPLICATION FILED JAN. 3, 1921.
1,395,415.
Patented Nov. 1, 1921.
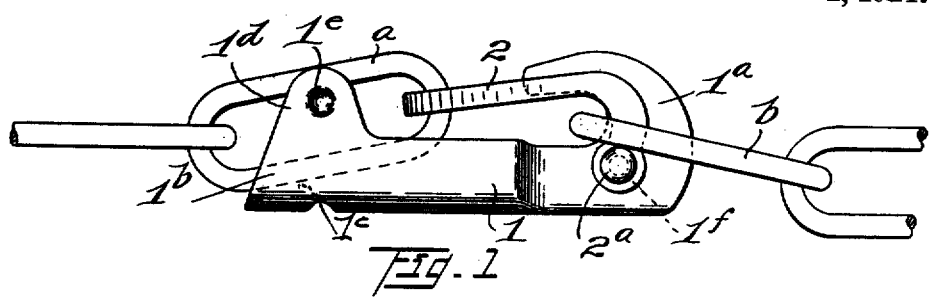
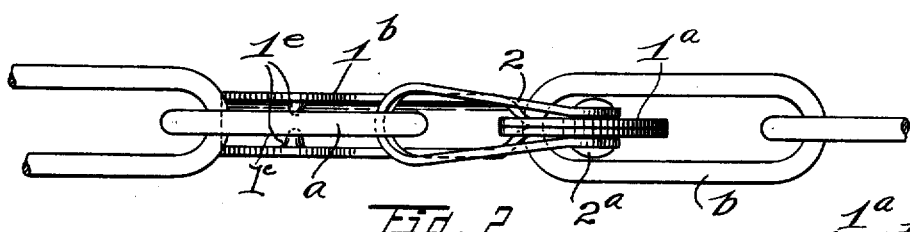
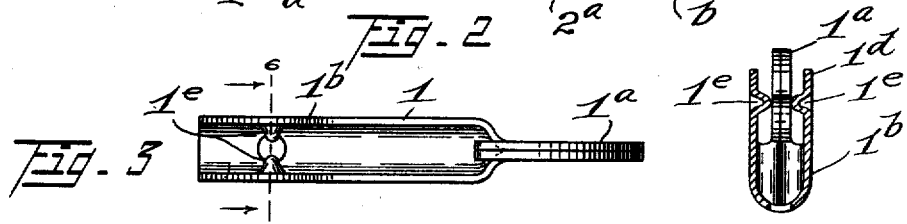
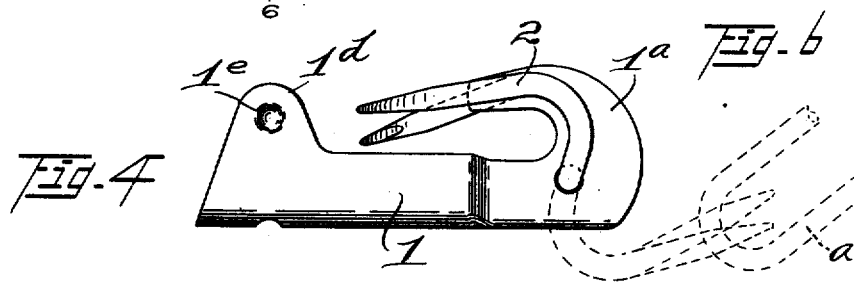
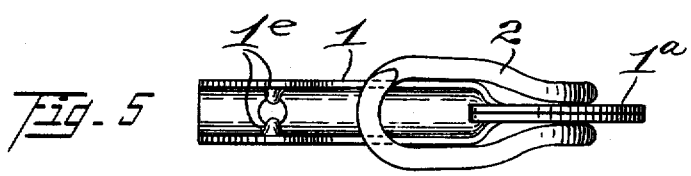
Inventor
Hugh T. Hughes
By
Fred E. Billman
Attorney

UNITED STATES PATENT OFFICE.

HUGH T. HUGHES, OF CLEVELAND, OHIO, ASSIGNOR TO THE CLEVELAND CHAIN & MFG. COMPANY, OF CLEVELAND, OHIO, A CORPORATION OF OHIO.

CHAIN-LINK CONNECTOR.

1,395,415.  Specification of Letters Patent.  Patented Nov. 1, 1921.

Application filed January 3, 1921. Serial No. 434,456.

*To all whom it may concern:*

Be it known that I, HUGH T. HUGHES, a citizen of the United States, residing at Cleveland, in the county of Cuyahoga and State of Ohio, have invented certain new and useful Improvements in Chain-Link Connectors, of which the following is a specification.

My invention relates to improvements in chain link connectors, and more particuarly to that class or type which is particularly designed and adapted for use in connecting the ends of the side chains or members of ordinary "non-skid" chains commonly employed in connection with automobile tires.

The primary object of the invention is to provide a generally improved chain link connector of this class, which will be exceedingly simple in construction, cheap of manufacture, and efficient in use.

A further object is the provision of a link connector which may be readily attached to the circumferentially extending chains or side members of non-skid chains, and when so attached may be readily connected to the adjacent links of the side chains to draw the latter together in the act of securing the chain about the tire, suitable leverage being provided through the improved lever and fulcrum link for such purpose, the arrangement of the parts being such that when the lever member is closed the pulling strain or stress will be transferred to the base portion of the lever and fulcrum link, and the connected link will be thrown past the dead center of the fulcrum point whereby the lever will be securely retained in position and in fact normally pulled toward its closed position.

A still further and very important object of the invention is to provide a device of this class in which the operation of connecting and disconnecting the adjacent side members of a non-skid chain may be quickly effected and in which the liability of the lever or other parts becoming opened or disarranged will be reduced to a minimum.

With the above mentioned and other ends in view, the invention consists in the novel construction, arrangement and combination of parts, hereinafter described, illustrated in some of its embodiments in the accompanying drawings, and particularly pointed out in the appended claims.

Referring to the drawings, forming a part of this specification, Figure 1 is a side elevation of the improved link connector in its closed or operative position as applied to the adjacent or connected links of an ordinary chain.

Fig. 2, an edge view of the same in connected position.

Fig. 3, an edge view of the improved lever member detached from the fulcrum link thereof.

Fig. 4, a side elevation of the same in connection with a fulcrum link of the well known "open link" type.

Fig. 5, an edge view of the same, the parts being in their relatively closed positions as indicated in full lines in Fig. 4.

Fig. 6, a cross sectional view of the free end of the lever member taken on line 6—6 of Fig. 3.

Similar numerals of reference designate like parts throughout all the figures of the drawings.

The improved connector is adapted to be connected to the links of any ordinary chain, as indicated, for example,—in the drawings.

The improved connector comprises a suitable lever member 1, provided at one end with a base or fulcrum hook $1^a$, and at its other or free end with a link receiving and engaging head $1^b$, the latter being preferably provided with a recess $1^c$, to receive one side of one of the links (in the present instance, the connected link carried by the fulcrum link hereinafter referred to), said link receiving and engaging head being provided with suitable means for interlocking with the adjacent link, and particularly adapted to prevent accidental opening or return of the lever in the event that the chain should become slackened or the tension removed.

As a convenient means of providing means for interlocking the free or link engaging head $1^b$, with an adjacent link when in its closed or connected position, the recess $1^c$, may be formed by means of spaced lug members $1^d$, and as a convenient means of manufacture the lever member may be formed of a single blank of sheet metal bent upon itself longitudinally forming the closed abutting members of the fulcrum hook $1^a$, and provided with suitably spaced apart members forming the recess $1^c$, to conveniently receive the side of the link to be connected.

The lugs $1^d$, are preferably provided with indentations forming struck-in studs $1^e$, adapted to pass over the side of the connected link $a$, which link, in the present instance, is carried by the fulcrum link to be hereinafter described. It will be obvious that when the lever is closed the studs $1^e$, will ride over the side of the link $a$, springing the side lugs $1^d$, slightly apart, and upon passing over the side of the link will snap into engagement therewith, as illustrated most clearly in Fig. 2 of the drawings.

As a means of attaching the fulcrum end of the lever member to one end of the chain to be connected, the base of the lever member is provided with a fulcrum opening $1^f$, to receive and contain the pivoted portion $2^a$, of the fulcrum link 2. The base or pivoted portion of the fulcrum link 2, is hook shaped to conform to the substantial contour of the inner or throat portion of the hook $1^a$, and it will be observed that when the lever is closed the strain or stress of the tension of the connected chain members is substantially transferred to the base portion of the lever member opposite the pivoted portion $2^a$, or the dead center of the connection, so that the lever will be normally held substantially in the position shown in Fig. 1 of the drawings.

The fulcrum link 2, may be formed of open pivoted or base members, as shown in Figs. 1 and 2 of the drawings, and be pivoted by means of a connecting pivot or rivet member in the specific form of a rivet as shown in the drawings referred to, or, if desired, the fulcrum link may be formed from an ordinary open link, as shown in Figs. 4 and 5 of the drawings, in which instance the opening is formed at the free end of the fulcrum link and the intermediate portion thereof forms the pivot portion $2^a$.

It attaching the connector to the free end of the chain to which it is desired to use the same, the fulcrum link 2, is initially passed through the connected link $a$, and then connected to the base portion of the lever member 1, by means of the pivot or rivet $2^a$, or in the form shown in Figs. 4 and 5, the open ends are passed through such link $a$, and then closed in the ordinary manner, and when it is desired to connect to the adjacent link $b$, of the chain to be connected and drawn up, the lever is extended in a substantially open position with relation to the fulcrum link, as indicated in dotted lines in Fig. 4 of the drawings, and after the free end or head $1^b$, is initially passed through the link $b$, the lever is moved toward its closed or reversed position thereby carrying the link $b$, into the throat or fulcrum portion of the hook $1^a$, and the lever is drawn to its closed position, the interlocking members $1^e$, passing over one side of the link $a$, and interlocking therewith as hereinbefore referred to.

Having thus described some of the embodiments of my invention, without having attempted to set forth all the forms in which it may be made, or all the modes of its use, what I claim and desire to secure by Letters Patent, is,—

1. A chain connector, comprising a lever provided with overlapping fulcrum hook and link members pivoted at one side of the base of said hook whereby when closed said fulcrum link and lever will be retained by the tension on the connected parts.

2. A chain connector, comprising a lever provided with a fulcrum hook and fulcrum link pivoted to each other at one side of the base of the said hook whereby when the lever is placed in engagement with an adjacent link and is closed, said fulcrum link will normally close said hook and said lever will be retained in a closed position.

3. A lever chain link connector, comprising a lever provided at one end with a chain link seat forming a projection and a connected fulcrum link, and a chain link carried by the latter, said lever and fulcrum link being adapted to pass through an adjacent link of the chain to be connected, the free end of said lever being provided with spaced spring lugs adapted to receive and interlock with the chain link carried by said fulcrum link.

4. In a chain connector, connecting link and lever members normally extending substantially parallel with each other and pivotally connected to each other at one end, said lever member being provided with a projection receiving the adjacent link of the connected chain and being provided at its free end with means for preventing the accidental opening of the lever when tension is removed between the connected links.

5. In a chain connector, a lever provided at one end with a fulcrum link carrying a chain link and arranged and pivoted to normally extend at one side of the lever when closed, said link and lever being adapted to extend through the adjacent link of the chain to be connected, the arrangement being such that the lever will be normally held closed, the free end thereof interlocking with the link carried by said fulcrum link.

6. A chain link connector, comprising a lever member provided at one end with a hook and a hook shaped fulcrum link adapted to be attached to one of the links of the chain to be connected, said lever member being adapted to pass through the adjacent link of the chain and to be returned over and to interlock with the link of the chain carried by said fulcrum link.

7. In a link connector for chains, a lever member provided at one end with a fulcrum link adapted to be connected to one end of the chain and to extend through a link of the other, said lever member being adapted to extend through the last mentioned link and form a seat therefor when closed opposite the dead center or fulcrum point thereof, the free end of said lever when closed interlocking with the link carried by said fulcrum link to prevent accidental displacement.

In testimony whereof I have affixed my signature.

HUGH T. HUGHES.